United States Patent [19]
Le Vantine

[11] 4,417,783
[45] Nov. 29, 1983

[54] PULSATING, OSCILLATING BICYCLE REFLECTOR

[76] Inventor: Allan D. Le Vantine, 18225 Rancho St., Tarzana, Calif. 91356

[21] Appl. No.: 244,263

[22] Filed: Mar. 16, 1981

[51] Int. Cl.³ .............................................. G02B 5/12
[52] U.S. Cl. ...................................................... 350/99
[58] Field of Search .......................... 350/97, 99, 299

[56] References Cited

U.S. PATENT DOCUMENTS

| | | | |
|---|---|---|---|
| 2,250,620 | 7/1941 | Bone | 350/97 |
| 3,551,024 | 12/1970 | Priest | 350/99 |
| 4,023,888 | 5/1977 | Klaenhammer et al. | 350/99 |

FOREIGN PATENT DOCUMENTS

| | | | |
|---|---|---|---|
| 46852 | 1/1933 | Denmark | 350/99 |
| 807492 | 4/1951 | Fed. Rep. of Germany | 350/99 |
| 300455 | 6/1928 | United Kingdom | 350/99 |

*Primary Examiner*—R. A. Rosenberger

[57] ABSTRACT

A novel signaling device for mounting on the rear of a bicycle that reflects and redirects light from a remote source back toward that source in the form of a pulsating or oscillating signal. It consists of a light collecting and directing means, such as a reflector or a refractive lens and a corner retro-reflector which is made to oscillate through a range of focal positions. The motion of the retro-reflector causes light from sources at any location in a particular field to periodically be reflected back to that location in a manner that produces either a pulsating signal or a signal that oscillates between separate portions of the device.

10 Claims, 17 Drawing Figures

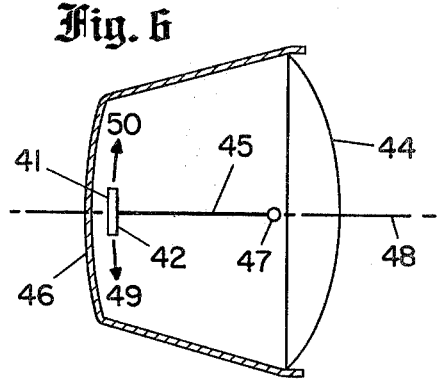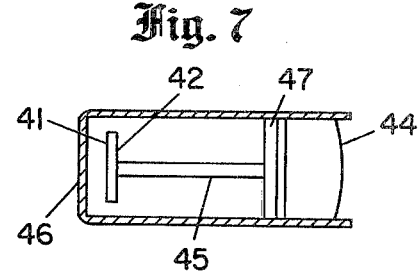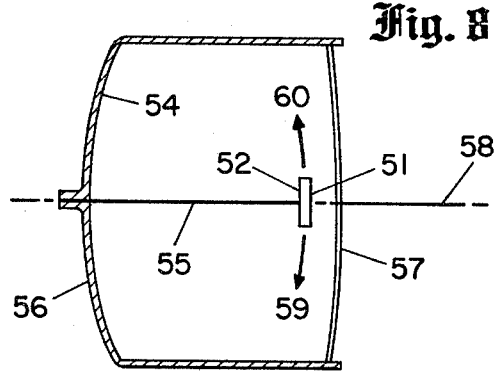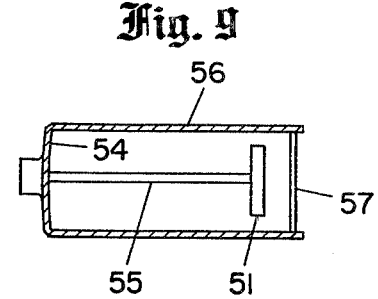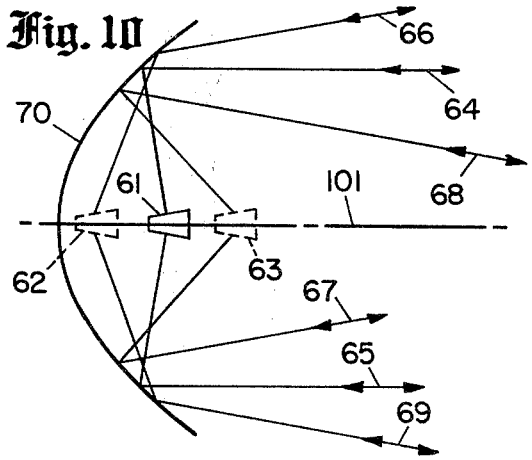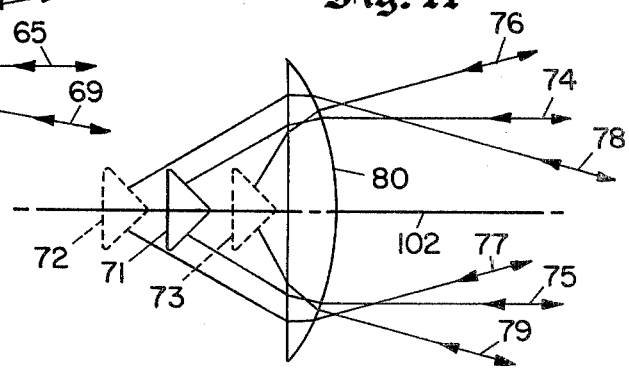

PULSATING, OSCILLATING BICYCLE REFLECTOR

This invention relates to the reflecting of light as a means of designating the presence of an object at night and more specifically to an improved rear reflector for a bicycle which produces a pulsating or oscillating signal that makes that bicycle very visible at night to overtaking vehicles.

Reflectors, as a means of indicating the presence of bicycles, have been in use for a very long time. Early reflectors consisted of a small button, about an inch and a half in diameter, affixed to the rear fender of the bicycle, and consisted of a transparent red glass, of a lens like shape, overlaying a reflective surface. Such devices were very directional and would reflect the headlights of an overtaking vehicle only when the vehicle was directly aligned with the device. Later rear reflectors incorporated designs involving internal reflections such that light received is returned in the direction of the initial source. These designs, termed corner retro-reflectors, have been improved over the years as technology and the availability of higher index of refraction optical materials became available.

Present bicycle reflectors are very efficient in that they return, in the direction from which is is received, a high percentage of the light incident upon them. However, their effectiveness in making a bicycle and its rider easily visible to overtaking motorists is currently considered marginal, primarily because of their small size. This fact has been extensively discussed in the recent literature and it is continually pointed out that improved techniques are needed. Such techniques as dressing the rider in garments coated with highly reflective coatings (such as 3M Scotchguard) are being offered to increase the area of reflectivity. These garments are reflective and are an improvement over ordinary clothing, but are not brightly visible, due to the fact that they reflect the light in all directions rather than specifically in the direction of the source. Flags with these same coatings are also available, but their actual effectiveness is also limited.

One factor that makes any reflective item more effective is motion. A moving reflector is 3 to 4 times more detectable than a stationary reflector. This technique has been used advantageously with the advent of wheel reflectors. These reflectors attach to the spokes, and as the wheels turn they provide excellent visibility for the side of the bicycle (U.S. Pat. Nos.: 3,960,437 and 3,951,517). However, they are not effective from the rear of the bicycle where they cannot be seen. Pedal reflectors are used to provide a moving element visible from the rear. However, pedal reflectors, of necessity, must be very small, and although they are usually moving, their small size minimizes their effectiveness.

Rotating reflective devices, such as that depicted in U.S. Pat. Nos.: 3,528,721 and 4,105,286, which are coupled by friction to the wheel of the bicycle are also effectively marginal because of their small size, and are most often considered undesireable because of their contact with the moving parts of the bicycle. Other rotating reflectors have been devised that rotate by wind (U.S. Pat. Nos.: 4,204,746 and 4,105,286). However, these do not appear to be the type of equipment that is practical for bicycle use.

One reflective device, U.S. Pat. No.: 4,023,888 is designed as a stationary device to produce a flashing retro-reflection from vehicle headlights. However, an analysis of the design as described shows it to be very unidirectional for this purpose and will receive and reflect light only along a specific optical axes. The value of such a device used as a bycycle reflector is questionable because of this unidirectional characteristic. Another device, U.S. Pat. No.: 3,551,024 utilizes a lens focusing on a multifaceted retro-reflecting surface such that incident light arriving from different directions is either reflected back to the source, or not reflected back to the source. Thus, a flashing signal occurs to a viewer near the source of light only if the axis of the device is continually changing relative to a line from the source to the device. To a motorist overtaking a bicycle this axial deviation is not likely to occur very rapidly. Therefore, the device would appear constant, either reflective, or dark, for periods of time longer than would be desired.

It is accordingly, the objective of the present invention to provide a rear reflecting device for a bicycle that is highly visible to overtaking motorists.

It is another objective of the invention to provide a rear reflecting device that returns a high percentage of the light incident upon it toward the source of origin.

It is also another objective of the invention to collect light from a source over a large area and return that light to the source from that same large area.

It is yet another objective of the invention to return the light to the source in a pulsating manner or an oscillating manner such that the reflected light appears to be flashing or moving back and forth.

It is an additional objective of the invention to provide a rear reflecting device that is suitable and unobtrusive for mounting on the rear of a bicycle or vehicle.

Briefly stated, and in accord with the presently preferred embodiments of the invention, a light collecting device is provided with focuses light, from a remote source, onto a corner retro-reflector. Said corner retro-reflector in turn reflects the light received, from the light collecting device, back to the light collecting device, whence the light collecting device, acting as a light directing device, returns the light in the direction from which it initially originated. Further, said corner retro-reflector is suspended on an elastic support of such design that, through an inertial coupling to the motions of the bicycle, the corner retro-reflector is caused to oscillate in an harmonic cycle. Such harmonic oscillation results in the corner retro-reflector cyclically moving between two points, in a preferred direction, so as to continually change the location and direction from which the corner retro-reflector receives and returns light from and to the light collecting device, and thusly the spacial direction from which the device as a whole receives and returns light.

Many ramifications of the invention are possible utilizing different elements as light collectors and designing them in different ways to provide specific capabilities. Also, many methods are readily conceived for supporting the corner retro-reflector to provide the inertial coupling to the motion of the bycycle to produce a cyclical harmonic oscillation. However, for practicality only five embodiments will be discussed in detail. These are: (1) a reflective collector with a suspension to produce a fore and aft motion of the retro-reflector, (2) a refractive collector with a fore and aft motion retro-reflector, (3) a refractive collector with a lateral motion of the retro-reflector, ((4) a reflective collector with a suspension system to produce a lateral motion of the retro-reflector, and (5) an embodiment combining both a refractive and a reflective collector. Further, a general discussion of other possibilities will be disclosed.

For a complete understanding of the invention, together with an appreciation of the objectives and ramifications thereof, please refer to the attached drawings and the following descriptions of the drawings in which:

FIG. 6 is a cross section of a third embodiment of the invention.

FIG. 7 is a sectional view of the embodiment of FIG. 6 along axis 48.

FIG. 8 is a cross section of a fourth embodiment of the invention.

FIG. 9 is a sectional view of the embodiment of FIG. 8 along axis 58.

FIG. 10 is an optical ray diagram of the embodiment of FIG. 2.

FIG. 11 is an optical ray diagram of the embodiment of FIG. 4.

Figure 14:
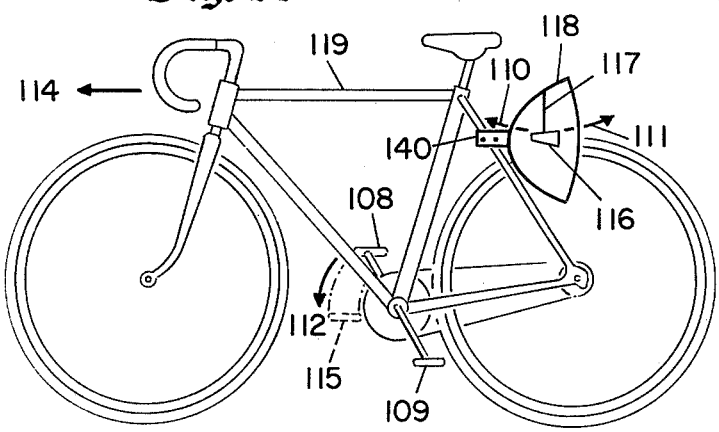
FIG. 14 is a sectional view of the embodiments of FIG. 2 mounted on a bicycle.
Figure 15:
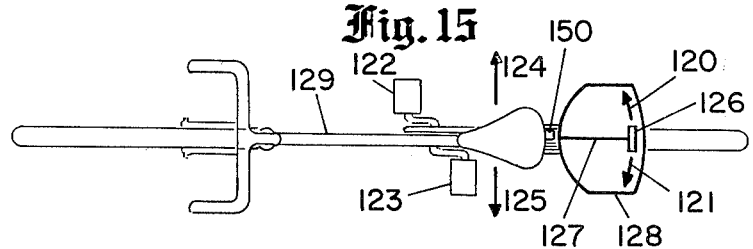
FIG. 15 is a sectional view of the embodiment of FIG. 8 mounted on a bicycle.

The embodiments of the invention are envisioned, but not specifically limited to, being mounted on the rear of a bicycle as shown if FIGS. 14 and 15. These embodiments all incorporate a corner retro-reflector, the principles of which are shown in the two dimensional ray diagram FIG. 1. The corner retro-reflector is composed of a transparent optical material 11 with a first surface 10, which is planar, and a second surface 12, which is shaped as a consecutive series of 90° corners, each corner three dimensionally consisting of the intersection of three surfaces or facets. The characteristic of a corner retro-reflector is that it reflects and returns incident light along the same axis from which it arrived. This can be seen from the diagram FIG. 1. Ray 13 from a remote light source, passes through planar surface 10 and impinges on a first facet of surface 12, whence it is reflected to a second facet of surface 12. Since the angle between the facets is 90°, geometry dictates that the sum of angles of incidence of the light on the first surface and the second will equal 90°. Thus, the sums of the angles of incidence and the angles of reflection of the two facets is 180°. Hence, the light leaves the corner retro-reflector as ray 14, axially parallel to incoming ray 13, but in the opposite direction.

If an incident ray arrives at surface 10 from an off axis position, such as ray 15, it is refracted at surface 10 through angle $\phi$, in accord with Snell's Law of refraction. Such ray then travels through the optical material, is reflected from at least two facets of surface 12 and returns to surface 10 in a direction 180° from its incidence on surface 12. Passing through surface 10 it is refracted again through angle $\phi$ and leaves as ray 16 traveling axially parallel to incoming ray 15, but in the opposite direction.

Thus, rays incident on a corner retro-reflector are referred toward the source from which they originated. This is an important feature of the retro-reflectors employed in this invention. It should be appreciated that although the foregoing description is for a two dimensional system, the arguments hold for the three dimensional applications which are incorporated in this invention.

Figure 1:
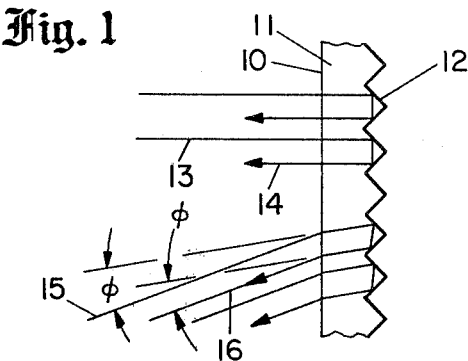
FIG. 1 is a cross sectional ray diagram of a corner retro-reflector.
Figure 2:
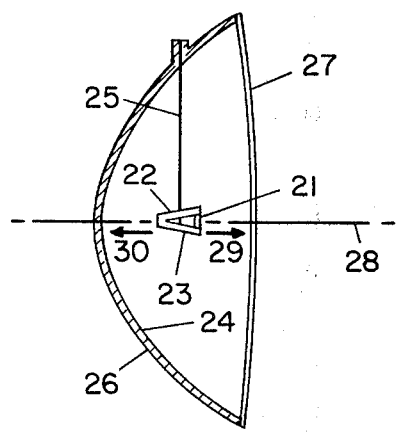
FIG. 2 is a cross section of one embodiment of the invention.
Figure 3:
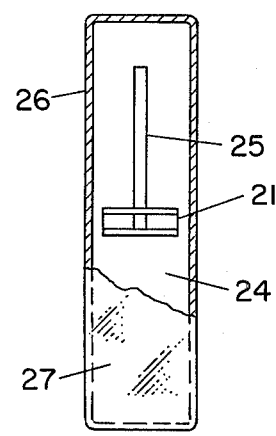
FIG. 3 is an end view of the embodiment of FIG. 2.

The first embodiment of the principle of the invention to be described is shown in FIGS. 2 and 3. It is comprised of a case means 26 which is contoured so that its inner surface 24 conforms to a specifically designed optical curvature and is optically smooth and is made highly reflective by coating with an appropriate reflective material. A rectangular double faced corner retro-reflector 21, with faces 22 and 23 each, as shown in FIG. 1, facing toward opposite sides of reflector 24, is supported on flat spring 25 from the wall of case means 26. The internal assembly is enclosed, as shown, by transparent plate 27.

In this embodiment the optical contour of the surface 24 is that of a geometric parabola of revolution about axis 28. As shown in FIG. 3, the parabola of revolution is truncated, and the case means 26 conforms to this shape, as shown, while allowing ample freedom for retro-reflector 21 to move in directions 29 and 30, by the orientation of flat spring 25, which flexes only in these directions, by nature of the orientation of its flatness, and thus does not allow retro-reflector to contact the flat sides of the case means.

Flat spring 25 which supports retro-reflector 21 permits the retro-reflector to move relative to case means 26 only in directions 29 and 30 when subject to inertial forces. And, as directions 29 and 30 lie principally parallel to axis 28 displacement of 21 will occur as the result of an acceleration of the case means along this axis. Such displacement results in the storage of energy in spring 25. If the acceleration is relaxed the energy stored in spring 25 is expended to restore 21 to its original location by accelerating it toward that location. However, as the spring and the retro-reflector are free from any significant damping friction, the retro-reflector will overshoot the original position and start oscillating in a manner known as Simple Harmonic Motion, with a period determined by the elasticity of the spring 25 and the mass of the retro-reflector 21.

If the embodiment of FIG. 2 is mounted on the rear of a bicycle as shown in FIG. 14 the motions of the bicycle can produce accelerations that will cause retro-reflector 21 to continuously oscillate provided the proper components are judiciously selected for the embodiment shown. Referring to FIG. 14, as the bicycle is pedaled force is applied to a pedal by the foot of the rider to move it downward such as pedal 108 in direction 112. This downward force imparts an acceleration which varies from minimal to maximal and back to minimal as pedal 108 moves downward to position 115. This periodic acceleration is transferred from the pedals through sprockets and a chain to the rear wheel. The rear wheel, by reacting with the ground, results in the periodic acceleration of the bicycle in the direction 114. This acceleration is continually applied and relaxed as each foot alternately undertakes a downward stroke on the pedals 108 and 109.

The frequency of pedaling accelerations varies with the individual cyclist and with conditions. However, the frequency appears to range mostly between 60 and 100 cycles per minute. This equates to an average period between accelerations of 0.75 seconds. By selecting a spring 117 with the appropriate spring force, for a retro-reflector 116 with given mass a simple Harmonic Motion period of 0.75 seconds can be attained which will coincide with the accelerations of the bicycle. Such accelerations are imparted from the bicycle 119 through attaching bracket 140 to the case means 118 to which retro-reflector 116 is attached by spring 117 and thereby effectively producing an inertial coupling between the bicycle and the retro-reflector. The retro-reflector 117 would be set in motion by the acceleration through this inertial coupling and maintained in motion as the cyclic accelerations continued.

It is well to note that the period of the accelerations and the period of the harmonic oscillations of the retro-reflector need not exactly coincide in order to perpetuate the motion. Accelerations of a different periodicity will merely make the oscillations greater at times and cause them to diminish at other times depending on the difference between the frequencies of the two periodic oscillations. If a coincidence did result in the retro-reflector oscillation stopping, it would only be momentary and the coupling would immediately start it swinging again in directions 110 and 111.

The optical characteristics of the embodiment can be understood by referring to ray diagram FIG. 10. Optical reflector 70 is appreciably a paraboloid as described for 24 FIG. 2. Retro-reflector 61 is as described for that of 21 FIG. 2, is shown at the natural focus of the paraboloid. Other positions of the retro-reflector are shown along the optical axis of the parabola as 62 and 63. Retro-reflector 61 oscillates between these two positions. Rays from a source of light lying at a distance along axis 101, such as those identified as rays 64 and 65, impinge on reflector 70 and are focused to the location 61 of the retro-reflector. If the retro-reflector is at this location it will return rays 64 and 65 to the reflector 70 where they are directed back in the direction from which they came. If the retro-reflector is not at position 61, then the rays 64 and 65 will not be returned. Thus, if an observer is located adjacent to the source of the light along the axis 101, he would see light reflected from the full aperture, of the view, of the device shown in FIG. 3 when the retro-reflector is at position 61 and the aperture would be dark when the retro-reflector is at any other position. Thus, as the retro-reflector oscillates the aperture would appear to flash the light back twice with each cycle.

If the source of light is off to one side of the axis 101, such as in the direction denoted by rays 68 and 69, light will be returned from the left side of the aperture when the retro-reflector is in position 62. This can be seen by tracing ray 69. Light will be returned from the right side of the aperture when the retro-reflector is in position 63. This can be seen by tracing ray 68. Thus, as the retro-reflector oscillates between the two locations 62 and 63, an observer adjacent to the light source would see the two sides of the aperture light up alternately.

Similarly, if the light source is to the opposite side of the axis 101 in the direction of rays 66 and 67 the two sides of the aperture would alternately appear to light up to an observer.

An additional character of the embodiment described is that the reflected light can be made to reflect only a specific color. Any of the optical elements can be made color selective to provide this characteristic. For example, if the retro-reflector is fabricated from a red tinted transparent optical material it will filter out all but the red rays and the device would be seen to produce a red reflection. Or, if transparent plate 27 in FIG. 2 is tinted to transmit specifically one color the device would reflect only that color.

Figure 4:
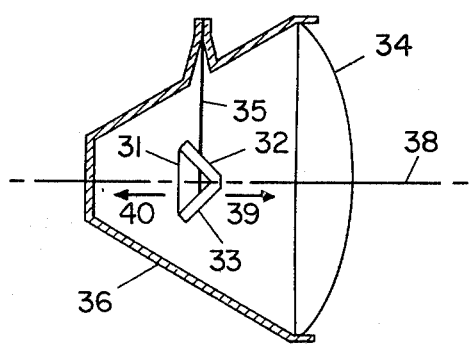
FIG. 4 is a cross section of a second embodiment of the invention.
Figure 5:
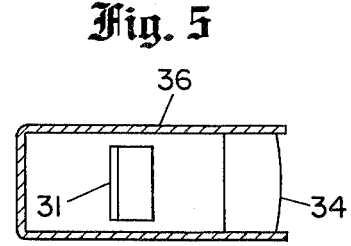
FIG. 5 is a sectional view of the embodiment of FIG. 4 along axis 38.

A second embodiment of the principle of the invention is shown in FIGS. 4 and 5. It consists of a positive lens 34 of rectangular shape supported by a case means 36 which encloses a volume behind the lens and creates a cavity. Within the cavity is a couble-faced corner retro-reflector 31, similar to that previously described, consisting of two rectangular faces 32 and 33 set at an angle of about 90° to each other. The retro-reflector is supported on a flat spring from one wall of the case means. The lens and the retro-reflector are centered along the axis 38 which is the optical axis of the device.

Similar to the first embodiment the spring permits the retro-reflector to oscillate in a Simple Harmonic Motion, in a preferred direction. And, when mounted on a bicycle as shown in FIG. 14 it will respond, through inertial coupling, to the acceleration variations due to the pedaling of the bicycle identical to that described for the first embodiment.

The optical characteristics of this embodiment can be understood by referring to the ray diagram FIG. 11. Positive lens 80 focuses rays from a remote light source so that they impinge on the faces of the retro-reflector and are returned in the opposite direction from which they came, as follows:

Light from a remote source, at some distance from the device, lying along axis 102 will be focused by the lens to the retro-reflector in position 71 as indicated by tracing rays 74 and 75. The retro-reflector returns the rays back through the lens and toward the light source. When the retro-reflector oscillates to any other location there will be no light returned in this direction. Hence, an observer adjacent to the light source would see a flashing reflection of the light which fills the entire aperture of the device and has a period twice that of the oscillating retro-reflector.

If the light source is off to one side of axis 102 in the direction shown by the rays 78 and 79 it can be seen that a ray on the left side, ray 79, will impinge on the retro-reflector in position 73. Light from a ray on the right side, ray 78, will impinge on the retro-reflector in position 72. Thus, as the retro-reflector oscillates between positions 73 and 72, an observer adjacent to the light source will see first one side of the aperture of the lens illuminated and then the other with an alternating period equivalent to that of the period of the retro-reflector. Similarly, for a light source positioned to the other side of the axis 102 indicated by the direction of rays 76 and 77 will produce an identical alternating appearance.

A third embodiment of the principle of the invention is shown in FIGS. 6 and 7. This embodiment is identical to the second embodiment except that the corner retro-reflector is mounted so that it oscillates in a direction transverse to the optical axis 48 in directions 49 and 50. It consists of a case means 46, a rectangular positive lens 44, a corner retro-reflector 41, with a rectangular face 42 supported on a flat spring 45, which allows it to move in preferred directions 49 and 50, mounted on a support 47, attached to case means 46.

This embodiment is conceived to be mounted on a bicycle 129 as shown in FIG. 15. The retro-reflector is sensitive to and reacts to lateral accelerations of the bicycle in directions 124 and 125. Such accelerations result from the pedaling of the bicycle first on pedal 122 with one foot and then on pedal 123 with the other. Although such pedal accelerations primarily induce a forward acceleration to the bicycle, they also, at times, tend to induce a swaying motion which produces the accelerations in the directions 124 and 125. These periodic lateral accelerations imparted from bicycle 129 through attaching bracket 150 to case means 128 to which retro-reflector 126 is attached by spring 117 will produce an effective inertial coupling between the retro-reflector and the bicycle. Hence, a simple harmonic motion of the spring mounted retro-reflector will result causing the retro-reflector to oscillate in directions 120 and 121.

Figure 12:
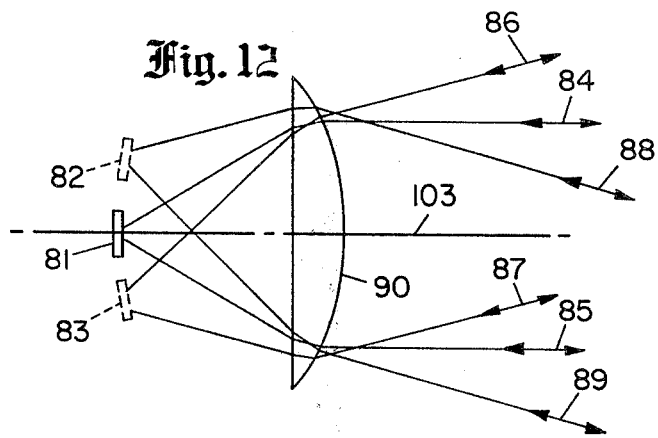
FIG. 12 is an optical ray diagram of the embodiment of FIG. 6.

To understand the optical characteristics of this embodiment of the invention refer to FIG. 12. Positive lens 90 focuses light from a remote source onto the oscillating retro-reflector to produce the following characteristics. Light from a remote source lying along axis 103 is focused by lens 90 to the retro-reflector in position 81, as indicated by rays 84 and 85, and will reflect light back toward the source from that position. Off axis rays from one side as indicated by rays 88 and 89 will be focused to retro-reflector position 82 and will return light back to the source from this position. Similarly light from the opposite side of axis 103 represented by rays 86 and 87 will be focused on retro-reflector position 83 and will return light accordingly.

An observer adjacent to a light source at each of the three locations will see the following: From the position on axis the light will be returned every time the retro-reflector crosses position 81. Thus, the light will flash and fill the entire lens aperture two times for every cycle of the retro-reflector. For either of the off axis positions shown the light will be returned from the one extreme position either 82 or 83 of the retro-reflector. Thus, once with each oscillation of the retro-reflector the light will flash and fill the entire aperture of the lens.

A fourth embodiment of the principle of the invention is shown in FIGS. 8 and 9. This embodiment is similar to the first embodiment presented except that the corner retro-reflector moves in a transverse rather than an axial direction. In this embodiment case means 56 is contoured to a prescribed optical configuration identified by surface 54 which is coated by a reflective material. Corner retro-reflector 51 has a rectangular face 52 and is supported by flat spring 55 mounted to case means 56 and is free to oscillate in directions 59 and 60. The cavity of the case means 56 is closed by transparent plate 57.

This embodiment is designed to be mounted on a bicycle as shown in FIG. 15. The retro-reflector is free to oscillate in directions 120 and 121 in response to lateral accelerations in directions 124 and 125 induced by pedaling the bicycle.

Figure 13:
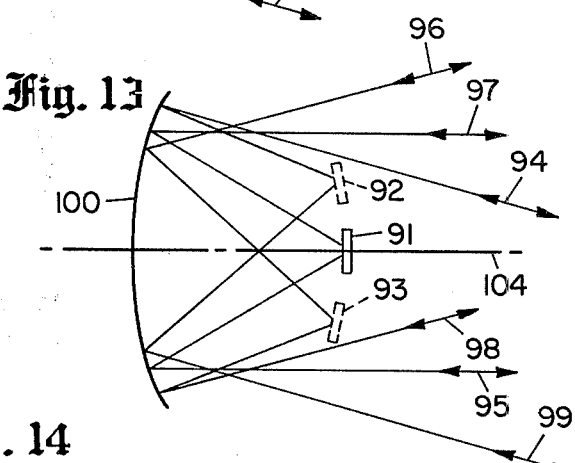
FIG. 13 is an optical ray diagram of the embodiment of FIG. 8.

FIG. 13 is an optical ray diagram that explains the characteristics of this embodiment. Light from a remote source lying along axis 104 is focused by reflecting surface 100 onto the retro-reflector in position 91 as depicted by rays 94 and 95. The retro-reflector returns the light to reflecting surface 100 where it is directed back toward the source. When the retro-reflector is at positions other than 91 no light will be returned. When the light source is off axis in the direction defined by the rays 94 and 99 light will be focused to the position 92 of the retro-reflector. From the direction defined by rays 96 and 98 the rays will be focused to retro-reflector position 93.

To an observer adjacent to a light source on the axis 104 the returned light will appear as a series of flashes and fill the entire aperture twice with each oscillation of the retro-reflector. From the off axis positions shown light will be returned as a series of flashes filling the entire aperture once with each oscillation of the retro-reflector.

Figure 16:
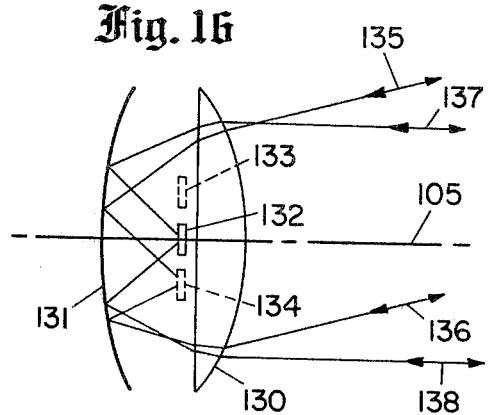
FIG. 16 is an optical ray diagram of a fifth embodiment of the invention.

A fifth embodiment of the principle of the invention is shown in FIG. 16. This embodiment is similar to that shown in FIGS. 6 and 8 and is in fact a combination of the two for the purpose of optically fore-shortening the device in order to make it more compact. It consists of positive lens 130, reflector 131, corner retro-reflector 132 which oscillates between positions 133 and 134, support for the retro-reflector (not shown) and a case means (not shown). By this combination the axial distance along axis 105 can be made much shorter than could be achieved by either of the other designs as the optical qualities of lens 132 and reflector 131 combine to considerably shorten the focusing of the light on the retro-reflector. This can be seen by tracing on-axis ray 137 and 138 to retro-reflector location 132 and off-axis rays 135 and 136 to retro-reflector location 134.

Figure 17:
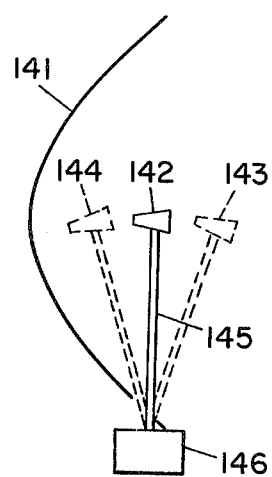
FIG. 17 is a schematic of an embodiment of the invention incorporating a retro-reflector oscillating device.

It should be understood that, although the embodiments described above incorporate an elastic support for the retro-reflector which permits it to be set in motion by the inertial forces of the supporting vehicle, the retro-reflector can be moved or oscillated by other means. Such means can consist of a mechanical coupling to a moving member of the vehicle or, as shown in FIG. 17, by an independent oscillating device 146. Device 146 supports retro-reflector 142 on a rigid arm 145 and moves it between positions 143 and 144 by means of an electrical or mechanical acuating mechanism.

The foregoing is a description of the principles of the invention and five embodiments of the invention have been described in varying depths of detail. It can be seen, and should be apparent to one skilled in mechanical and optical engineering, that many vatiations of the details of what has been disclosed can be made to achieve certain or specific design requirements, and many more modifications of the principle of the invention are possible. It should be recognized that many such details and modifications have been recognized by the inventor including those that incorporate combinations of the embodiments presented. It is therefore intended that the invention cover such variations in details as well as such modifications and be limited in scope only by the appended claims.

What is claimed is:

1. A reflecting device mounted on a bicycle that redirects light from a source back toward that source in the form of a pulsating or oscillating signal, comprising:

an optical means, for collecting light from a remote source and focusing it to a focal region, and for projecting light reflected from that focal region back toward the remote source, a retro-reflector means, for receiving light and returning that light in the same direction from which it was received, a support and oscillation means, for the retro-reflector means, that causes the retro-reflector means to move in a prescribed path, through the focal region of the optical means, with a regular periodic motion, a case means, for enclosing and supporting said components means, an attachment means, for affixing the case means to the bicycle.

2. The device of claim 1 wherein the optical means is an optically reflective concave surface of an appreciably parabolic shape.

3. The device of claim 1 wherein the optical means is an optically refractive positive lens.

4. The device of claim 1 wherein the optical means is a plurality of optical elements, both reflective and refractive, acting in combination.

5. The device of claim 1 wherein the retro-reflector means is a plurality of corner reflectors, nested in a regular tessalation each abutting its neighbor, joined in a plane as a single unit.

6. The device of claim 1 wherein the support and oscillation means provides the retro-reflector means with freedom of motion in an axial direction with respect to the axis of the optical means.

7. The device of claim 1 wherein the support and oscillation means provides the retro-reflector means with freedom of motion in a transverse direction with respect to the axis of the optical means.

8. The device of claim 1 wherein the support and oscillation means is a flat spring mounted transversely to the axis of the optical means such that it permits the retro-reflector means to react to the axial motions of the bicycle, resulting in an inertial coupling of the mass of the retro-reflector means to the accelerations of the bicycle causing the retro-reflector means, as governed by the elastic characteristics of the flat spring, to oscillate with simple harmonic motion along an appreciably axial path.

9. The device of claim 1 wherein the support and oscillation means is a flat spring mounted along the axis of the optical means such that it permits the retro-reflector means to react to the transverse motions of the bicycle, resulting in an inertial coupling of the mass of the retro-reflector means to the accelerations of the bicycle causing the retro-reflector means, as governed by the elastic characteristics of the flat spring, to oscillate with a simple harmonic motion along an appreciably transverse path.

10. A reflecting device mounted on a bicycle that redirects light from a source back toward that source in the form of a pulsating or oscillating signal, comprising:

an optical means, for collecting light from a remote source and focusing it to a focal region, and for projecting light reflected from that focal region back toward the remote source, a retro-reflector means, for receiving light and returning that light in the same direction from which it was received, a support means for the retro-reflector means that permits the retro-reflector means to move along a prescribed path through the focal region of the optical means, an oscillation means that causes the retro-reflector means to move with a regular periodic motion through the focal region of the optical means, a case means, for enclosing and supporting said component means, an attachment means, for affixing the case means to the bicycle.

* * * * *